(12) United States Patent
Katakura

(10) Patent No.: US 7,025,707 B2
(45) Date of Patent: Apr. 11, 2006

(54) MULTISTAGE AUTOMATIC TRANSMISSION

(75) Inventor: Takeji Katakura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 152 days.

(21) Appl. No.: 10/819,967

(22) Filed: Apr. 8, 2004

(65) Prior Publication Data

US 2004/0204288 A1 Oct. 14, 2004

(30) Foreign Application Priority Data

Apr. 9, 2003 (JP) ............... 2003-105400

(51) Int. Cl.
*F16H 59/30* (2006.01)
(52) U.S. Cl. .................................... 477/123
(58) Field of Classification Search ............... 477/123, 477/124
See application file for complete search history.

(56) References Cited

U.S. PATENT DOCUMENTS

| 4,495,838 A | * | 1/1985 | Gooch ................... 477/116 |
| 4,662,496 A | | 5/1987 | Sakakiyama |
| 5,046,174 A | | 9/1991 | Lentz et al. |
| 5,603,672 A | | 2/1997 | Zhang |
| 6,638,197 B1 | * | 10/2003 | Ogawa et al. ........... 477/174 |
| 6,819,997 B1 | * | 11/2004 | Buchanan et al. ......... 701/67 |
| 6,832,978 B1 | * | 12/2004 | Buchanan et al. ........ 477/174 |
| 2003/0027686 A1 | | 2/2003 | Shibata et al. |
| 2004/0009843 A1 | | 1/2004 | Habeck |

FOREIGN PATENT DOCUMENTS

| DE | 100 48 239 A1 | 10/2001 |
| EP | 0 805 292 A2 | 11/1997 |
| JP | 2002-357267 A | 12/2002 |

* cited by examiner

*Primary Examiner*—Dirk Wright
(74) *Attorney, Agent, or Firm*—Foley & Lardner LLP

(57) ABSTRACT

A multistage automatic transmission comprises first and second clutches and a throttle open degree sensor. The first and second clutches are arranged to establish odd and even speeds of the transmission when engaged. A control unit of the transmission is configured to carry out determining a desired speed of the transmission upon receiving information signals; causing at least one the first and second clutches to be engaged to establish the desired speed; and applying a limitation to an engaging force produced by at least one of the first and second clutches when the throttle open degree sensor senses that the open degree of a throttle valve is smaller than a predetermined degree.

9 Claims, 4 Drawing Sheets

MULTISTAGE AUTOMATIC TRANSMISSION

BACKGROUND OF THE INVENTION

1. Field of the Invention

The present invention relates in general to multistage automatic transmissions for wheeled motor vehicle, and more particularly to the multistage automatic transmissions of a constant-mesh type. More specifically, the present invention is concerned with the multistage automatic transmission having a speed change control system incorporated therewith.

2. Description of the Related Art

In order to clarify the task of the present invention, one of the multistage automatic transmissions of the above-mentioned type will be briefly described, which is disclosed in Japanese Laid-open Patent Application (Tokkai) 2002-357267. In this transmission, there are arranged first and second input shafts, synchromesh gear pairs, a first clutch for establishing ON/OFF connection between an associated engine and the first input shaft and a second clutch for establishing ON/OFF connection between the engine and the second shaft. By switching the first and second clutches, a speed change is carried out in the transmission. In this transmission, there are further provided mechanisms by which the ON/OFF operation of each clutch and a gear selection operation are automatically carried out.

SUMMARY OF THE INVENTION

In the above-mentioned known transmission, the first and second clutches are each constructed to produce a 100% engaging force when assuming an engaged condition. Thus, in a speed change, there is inevitably produced a discontinuous flow of the engaging force in each clutch, like the flow as 100% engaging force (before shift)→0% engaging force (during shift)→100% engaging force (after shift). This means that in a final stage of the speed change operation, the clutch shows the engaging force of 100% even when the torque from the engine is still small. This tends to induce generation of an undesirable shift shock of the transmission.

It is therefore an object of the present invention to provide a multistage automatic transmission, which is free of the above-mentioned shift shock.

In accordance with a first aspect of the present invention, there is provided a multistage automatic transmission for use with an engine of a motor vehicle, which comprises a first clutch that is able to establish an odd speed of the transmission when engaged, a second clutch that is able to establish an even speed of the transmission when engaged; a first clutch actuator that adjusts an engaging force produced by the first clutch; a second clutch actuator that adjusts an engaging force produced by the second clutch; a throttle open degree sensor that detects an open degree of a throttle valve of the engine; and a control unit that issues instruction signals to the first and second clutch actuators upon processing information signals applied thereto, the control unit being configured to carry out determining a desired speed of the transmission upon receiving the information signals; issuing an instruction signal to at least one of the first and second clutch actuators to engage the corresponding one of the first and second clutches for establishing the desired speed; and issuing an instruction signal to at least one of the first and second clutch actuators for applying a limitation to an engaging force produced by the corresponding one of the first and second clutches when the open degree of the throttle valve becomes smaller than a predetermined degree.

In accordance with a second aspect of the present invention, there is provided a multistage automatic transmission for use with an engine of a motor vehicle, which comprises a first clutch that is able to establish an odd speed of the transmission when engaged, a second clutch that is able to establish an even speed of the transmission when engaged; a first clutch actuator that adjusts an engaging force produced by the first clutch; a second clutch actuator that adjusts an engaging force produced by the second clutch; a throttle open degree sensor that detects an open degree of a throttle valve of the engine; and a control unit that issues instruction signals to the first and second clutch actuators upon processing information signals applied thereto, the control unit comprising a first section that determines a desired speed of the transmission upon receiving the information signals; a second section that issues an instruction signal to at least one of the first and second clutch actuators to engage the corresponding one of the first and second clutches for establishing the desired speed; and a third section that issues an instruction signal to at least one of the first and second clutch actuators for applying a limitation to an engaging force produced by the corresponding one of the first and second clutches when the open degree of the throttle valve is smaller than a predetermined degree.

In accordance with a third aspect of the present invention, there is provided a method for controlling a multistage automatic transmission for use with an engine of a motor vehicle, the transmission comprising a first clutch that is able to establish an odd speed of the transmission when engaged, a second clutch that is able to establish an even speed of the transmission when engaged; a first clutch actuator that adjusts an engaging force produced by the first clutch; a second clutch actuator that adjusts an engaging force produced by the second clutch; and a throttle open degree sensor that detects an open degree of a throttle valve of the engine. The method comprises determining a desired speed of the transmission upon receiving information signals; issuing an instruction signal to at least one of the first and second clutch actuators to engage the corresponding one of the first and second clutches for establishing the desired speed; and issuing an instruction signal to at least one of the first and second clutch actuators for applying a limitation to an engaging force produced by the corresponding one of the first and second clutches when the open degree of the throttle valve is smaller than a predetermined degree.

DETAILED DESCRIPTION OF THE INVENTION

Figure 1:
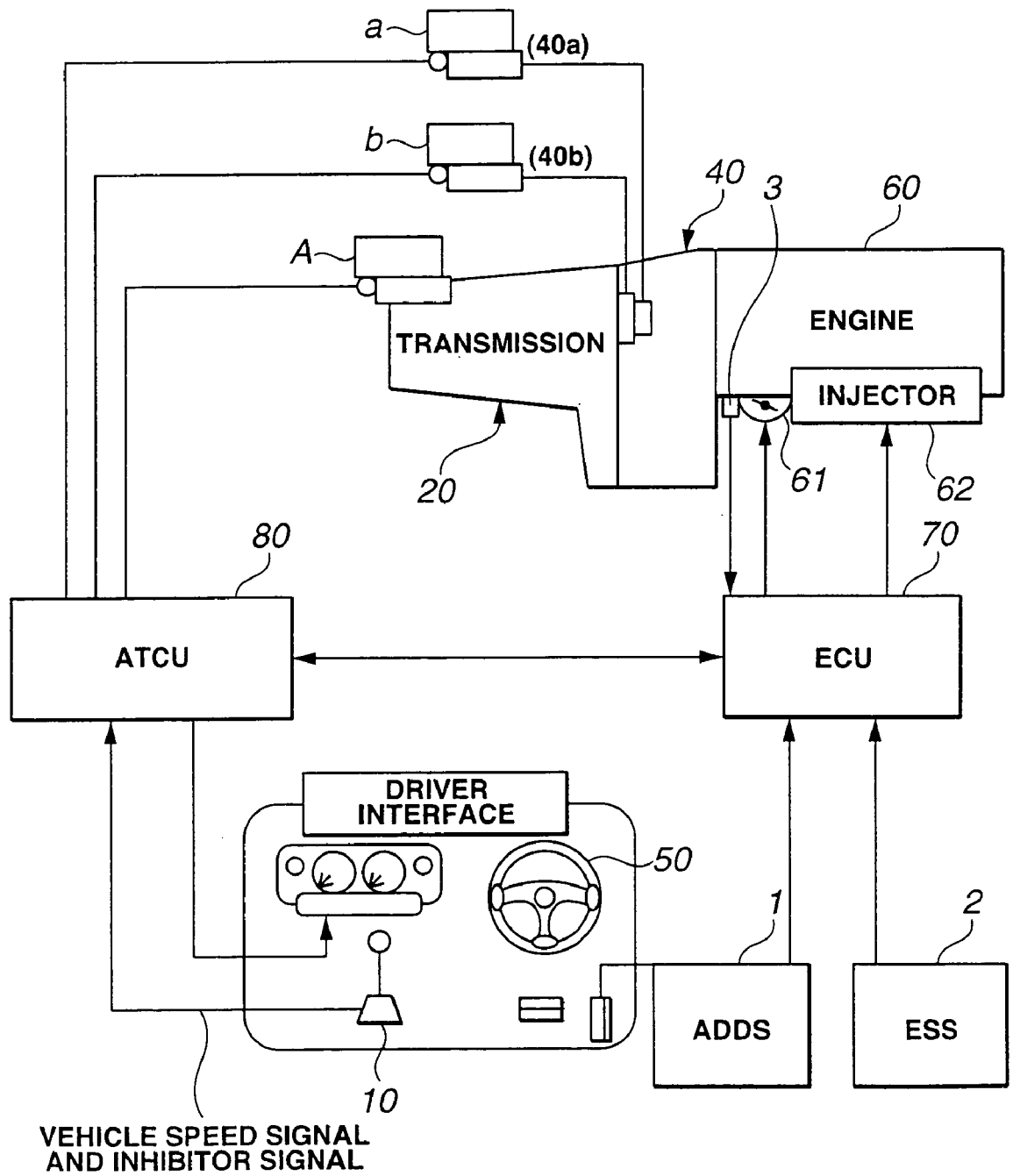
FIG. 1 is a schematic diagram of a speed change control system that is employed by a multistage automatic transmission according to the present invention.

Referring to FIG. 1 of the drawings, there is schematically shown a speed change control system 100 that is practically employed by a multistage automatic transmission according to the present invention.

In the drawing, denoted by numeral 60 is an engine, such as an internal combustion engine. Engine 60 has at its intake section an electronically controlled throttle valve 61 that electronically controls a throttle opening of an air intake passage. Engine 60 has also fuel injectors 62 each being exposed to a cylinder of engine 60 for injecting fuel thereinto. Denoted by numeral 20 is a multistage automatic transmission that is connected to an output member of engine 60 through an electrically controlled hydraulic clutch 40. Engine 60 is controlled by an engine control unit (ECU) 70, and transmission 20 is controlled by a transmission control unit (ATCU) 80. Each of the control units 70 and 80 has a micro-computer that includes CPU (central processing unit), RAM (random access memory), ROM (read only memory), and input and output interfaces. If desired, these two control units 70 and 80 may be united for using one micro-computer commonly.

As shown, an accelerator depression degree sensor 1, an engine speed sensor 2 and a throttle open degree sensor 3 feed engine control unit 70 with corresponding information signals. Transmission control unit 80 is fed with a vehicle speed signal and a range signal (viz., up-shift signal and down-shift signal) that is issued when a shift mechanism 10 is manipulated by a driver. The range signal represents the range that is just selected by the driver. Engine control unit 70 and transmission control unit 80 are electrically connected to exchange the information signals therebetween.

Upon processing the information signals fed thereto, engine control unit 70 issues control signals for controlling the throttle opening and the amount of fuel injected to each cylinder. Like this, upon processing the information signals fed thereto, transmission control unit 80 issues control signals for controlling a speed change actuator "A" and two actuators "a" and "b" of hydraulic clutch 40.

Figure 2:
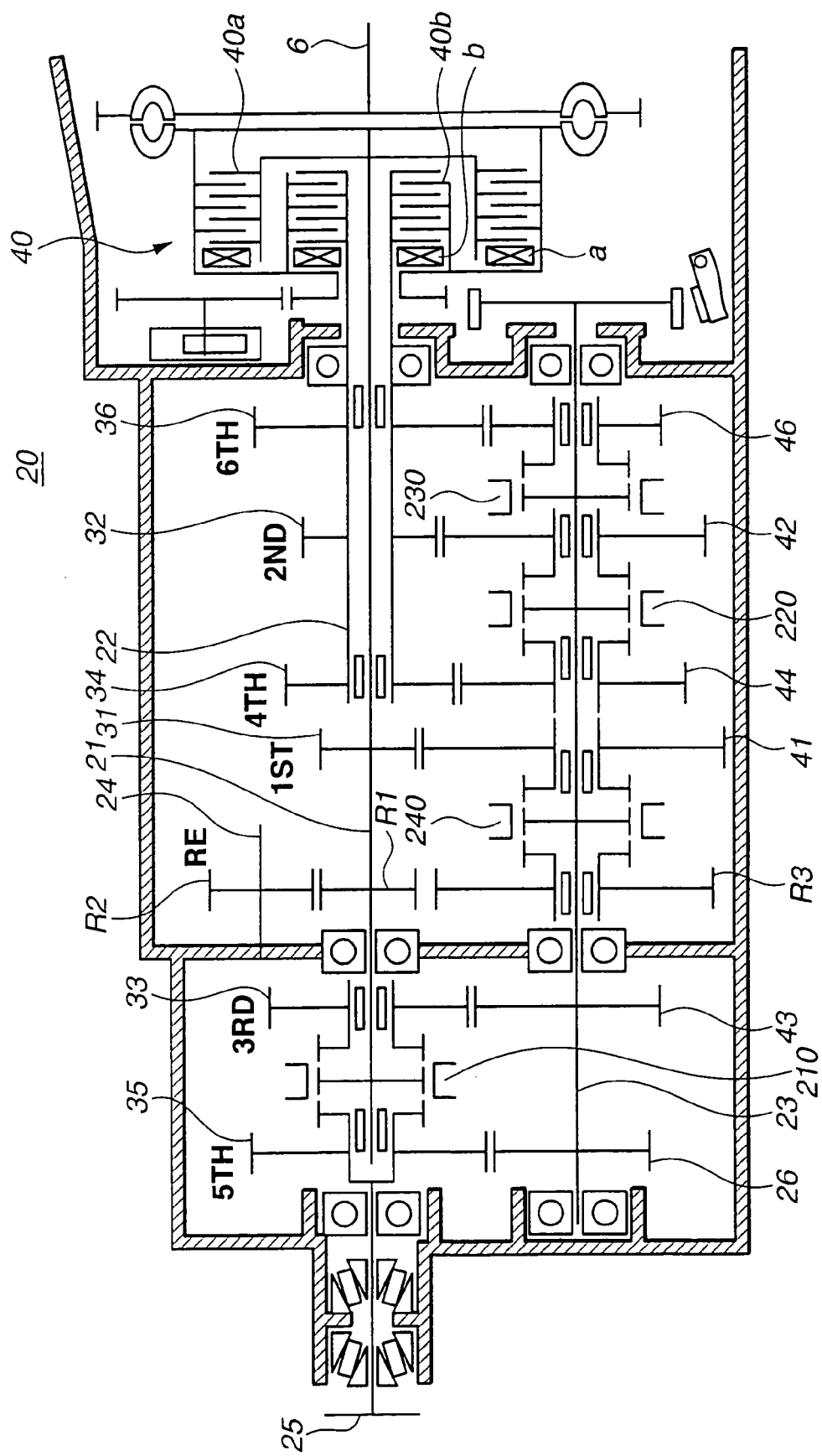
FIG. 2 is a schematic view of the multistage automatic transmission to which the present invention is practically applied.

Referring to FIG. 2, there is schematically shown the multistage automatic transmission 20. As shown, the transmission 20 has hydraulic clutch 40 operatively connected thereto.

The clutch 40 is of a twin type that comprises a first clutch 40a which carries out engagement/disengagement between a first input shaft 21 and an engine output shaft 6 with the aid of clutch actuator "a" (see FIG. 1) and a second clutch 40b which carries out engagement/disengagement between a second input shaft 22 and engine output shaft 6 with the aid of clutch actuator "b" (see FIG. 1).

As is seen from FIG. 2, second input shaft 22 is of a tube type that coaxially receives therein a part of first input shaft 21.

Disposed about first input shaft 21 are first and third speed drive gears 31 and 33 and a first reverse gear R1. First speed drive gear 31 and first reverse gear R1 are integral with first input shaft 21, while, third speed drive gear 33 is rotatably disposed about first input shaft 21.

Rotatably disposed about first input shaft 21 is the second input shaft 22. Disposed about second input shaft 22 are second, fourth and sixth speed drive gears 32, 34 and 36. These second, fourth and sixth speed drive gears 32, 34 and 36 are integral with second input shaft 22 to rotate therewith.

Arranged in parallel with first and second input shafts 21 and 22 are a countershaft 23 and an auxiliary shaft 24. Disposed on countershaft 23 are first, second, third, fourth and sixth speed driven gears 41, 42, 43, 44 and 46 and a third reverse gear R3. As shown, first, second, fourth and sixth speed driven gears 41, 42, 44, 46 and third reverse gear R3 are rotatably disposed about counter shaft 23, and third speed driven gear 43 is integral with counter shaft 23 to rotate therewith. For the purpose which will become hereinafter, a counter gear 26 is integral with countershaft 23 to rotate therewith.

Disposed about auxiliary shaft 24 is a second reverse gear R2 which is integral with the auxiliary shaft 24 to rotate therewith.

As shown, at a position opposite to clutch 40 with respect to first input shaft 21, there is arranged an output shaft 25 that is coaxial with first input shaft 21. A counter driven gear (or fifth speed drive gear) 35 is integral with output shaft 25 to rotate therewith and meshed with the above-mentioned counter gear 26 that is integral with countershaft 23. Although not shown in the drawing, driving road wheels are connected to output shaft 25 through a differential gear DG.

As shown, about first input shaft 21, there is arranged a 3–5 shift clutch 210 which selectively connects input shaft 21 with third speed drive gear 33 to achieve a third speed and connects input shaft 21 with counter driven gear 35 (viz., output shaft 25) to achieve a fifth speed.

About countershaft 23, there is arranged a 2–4 shift clutch 220 which selectively connects countershaft 23 with second speed driven gear 42 to achieve a second speed and connects countershaft 23 with fourth speed driven bear 44 to achieve a fourth speed.

Furthermore, about countershaft 23, there is arranged a 6-shift clutch 230 which selectively connects countershaft 23 with sixth speed driven gear 46 to achieve a sixth speed.

Furthermore, about countershaft 23, there is further arranged a 1-R shift clutch 240 which selectively connects countershaft 23 with first speed driven gear 41 to achieve a first speed and connects the countershaft 23 with third reverse gear R3 to achieve a reverse state.

3–5 shift clutch 210, 2–4 shift clutch 220, 6-shift clutch 230 and 1-R shift clutch 240 are all actuated by the above-mentioned speed change actuator "A" (see FIG. 1). That is, upon receiving a speed change instruction, each shift clutch 210, 220, 230 or 240 effects the engagement or disengagement for providing a torque transmission path that is needed by the speed change.

In the following, various torque transmission paths provided by multistage automatic transmission 20 will be described.

Under cruising, that is, when the associated vehicle is moving without carrying out the speed change, both first and second clutches 40a and 40b assume the engaged condition and a torque transmission from engine output shaft 6 to output shaft 25 of transmission 20 is achieved through either one of first and second clutches 40a and 40b.

[Neutral Condition]

In this condition, both first and second clutches 40a and 40b are in their disengaged condition. It is to be noted that the neutral condition is also achieved even when first and second clutches 40a and 40b assume their engaged condition so long as the shift clutches 210, 220, 230 and 240 are in their neutral positions.

[First Speed]

First clutch 40a is engaged and by the work of 1-R shift clutch 240, first speed driven gear 41 is united with countershaft 23. Under this condition, the torque from the engine output shaft 6 is transmitted to first clutch 40a, first input shaft 21, first speed drive gear 31, first speed driven gear 41, countershaft 23, counter gear 26, counter driven gear 35, output shaft 25 and then to differential gear DG and to the driving road wheels (not shown).

[Second Speed]

Second clutch 40b is engaged, and by the work of 2–4 shift clutch 220, second speed driven gear 42 is united with countershaft 23. Under this condition, the torque from the engine output shaft 6 is transmitted to second clutch 40b, second output shaft 22, second speed drive gear 32, second speed driven gear 42, countershaft 23, counter gear 26, counter driven gear 35, output shaft 25, differential gear DG and to the driving road wheels.

[Third Speed]

First clutch 40a is engaged, and by the work of 3–5 shift clutch 210, third speed drive gear 33 is united with first input shaft 21. Under this condition, the torque from the engine output shaft 6 is transmitted to first clutch 40a, first input shaft 21, third speed drive gear 33, third speed driven gear 43, countershaft 23, counter gear 26, counter driven gear 35, output shaft 25, differential gear DG and to the driving road wheels.

[Fourth Speed]

Second clutch 40b is engaged, and by the work of 2–4 shift clutch 220, fourth speed driven gear 44 is united with countershaft 23. Under this condition, the engine torque is transmitted to second clutch 40b, second input shaft 22, fourth speed drive gear 34, fourth speed driven gear 44, countershaft 23, counter gear 26, counter driven gear 35, output shaft 25, differential gear DG and to the driving road wheels.

[Fifth Speed]

First clutch 40a is engaged, and by the work of 3–5 shift clutch 210, counter driven gear (or fifth speed drive gear) 35 is united with first input shaft 21. Under this condition, the engine torque is transmitted to first clutch 40a, first input shaft 21, counter driven gear (or fifth speed drive gear) 35, output shaft 25, differential gear DG and to the driving road wheels.

[Sixth Speed]

Second clutch 40b is engaged, and by the work of 6-shift clutch 230, sixth speed driven gear 46 is united with countershaft 23. Under this condition, the engine torque is transmitted to second clutch 40b, second input shaft 22, sixth speed drive gear 36, sixth speed driven gear 46, countershaft 23, counter gear 26, counter driven gear 35, output shaft 25, differential gear DG and to the driving road wheels.

[Reverse Condition]

First clutch 40a is engaged, and by the work of 1-R shift clutch 240, third reverse gear R3 is united with countershaft 23. Under this condition, the engine torque from the engine output shaft 6 is transmitted to first clutch 40a, first input shaft 21, first reverse gear R1, second reverse gear R2, third reverse gear R3, countershaft 23, counter gear 26, counter driven gear 35, output shaft 25, differential gear DG and to the driving road wheels. Due to insertion of second reverse gear R2 between first and third reverse gears R1 and R3, the torque from the engine output shaft 6 a reversed rotation of output shaft 25 thereby to move the vehicle backward.

In the following, 1–2 Up-shift and 2–1 Down-shift will be described as exemplified shifting operation of the multistage automatic transmission 20.

[1–2 Up-shift]

As is described hereinabove, under first speed, first clutch 40a is engaged and by the work of 1-R shift clutch 240 (that is, by moving a coupling means of this clutch rightward in FIG. 2), first speed driven gear 41 is united with countershaft 23. In this first speed, also second clutch 40b assumes its engaged condition. Of course, in this case, other shift clutches 210, 220 and 230 are in their neutral conditions.

Upon starting of the up-shift, second clutch 40b is fully disengaged, and then, the coupling means of 2–4 shift clutch 220 is moved rightward to unite second speed driven gear 42 with countershaft 23. Since second clutch 40b has been fully disengaged, the uniting of second speed driven gear 42 with countershaft 23 does not induce any torque transmission at this stage. This condition is called as "pre-shift condition".

Then, the engaged condition of first clutch 40a is gradually released, and when the engine speed and the speed of second input shaft 22 become synchronized, the coupling means of 1-R shift clutch 240 is moved back to a neutral position to disconnect first speed driven gear 41 from countershaft 23, and then, second clutch 40b is gradually engaged while gradually increasing the engaging force produced by the same. With these steps, the 1–2 up-shift is completed.

[2–1 Down-shift]

As is described hereinabove, under second speed, second clutch 40b is engaged, and by the work of 2–4 shift clutch 220 (that is, by moving the coupling means of this clutch rightward in FIG. 2), second speed driven gear 42 is united with countershaft 23. In this second speed, also first clutch 40a assumes its engaged condition. Of course, in this case, other shift clutches 210, 230 and 240 are in their neutral conditions.

Upon staring of the down-shift, first clutch 40a is fully disengaged, and then, the coupling means of 1-R shift clutch 240 is moved rightward to unite first speed driven gear 41 with countershaft 23. Since first clutch 40a has been fully disengaged, the uniting of first speed driven gear 41 with countershaft 23 does not induce any torque transmission at this stage. That is, under this, the pre-shift condition is kept.

Then, the engaged condition of second clutch 40b is gradually released in accordance with an after-described "clutch-slip control", and when the engine speed and the speed of first input shaft 21 become synchronized, the coupling means of 2–4 shift clutch 220 is moved back to a neutral position to disconnect second speed driven gear 42 from countershaft 23, and then, first clutch 40a is gradually engaged while gradually increasing the engaging force produced by the same in accordance with the after-described "clutch-slip control". With these steps, the 2–1 down-shift is completed.

Other up and down-shifts are carried out similarly. Since the operation steps of these up and down-shifts are substantially the same as those of the above-mentioned steps, explanation of them will be omitted.

Figure 3:
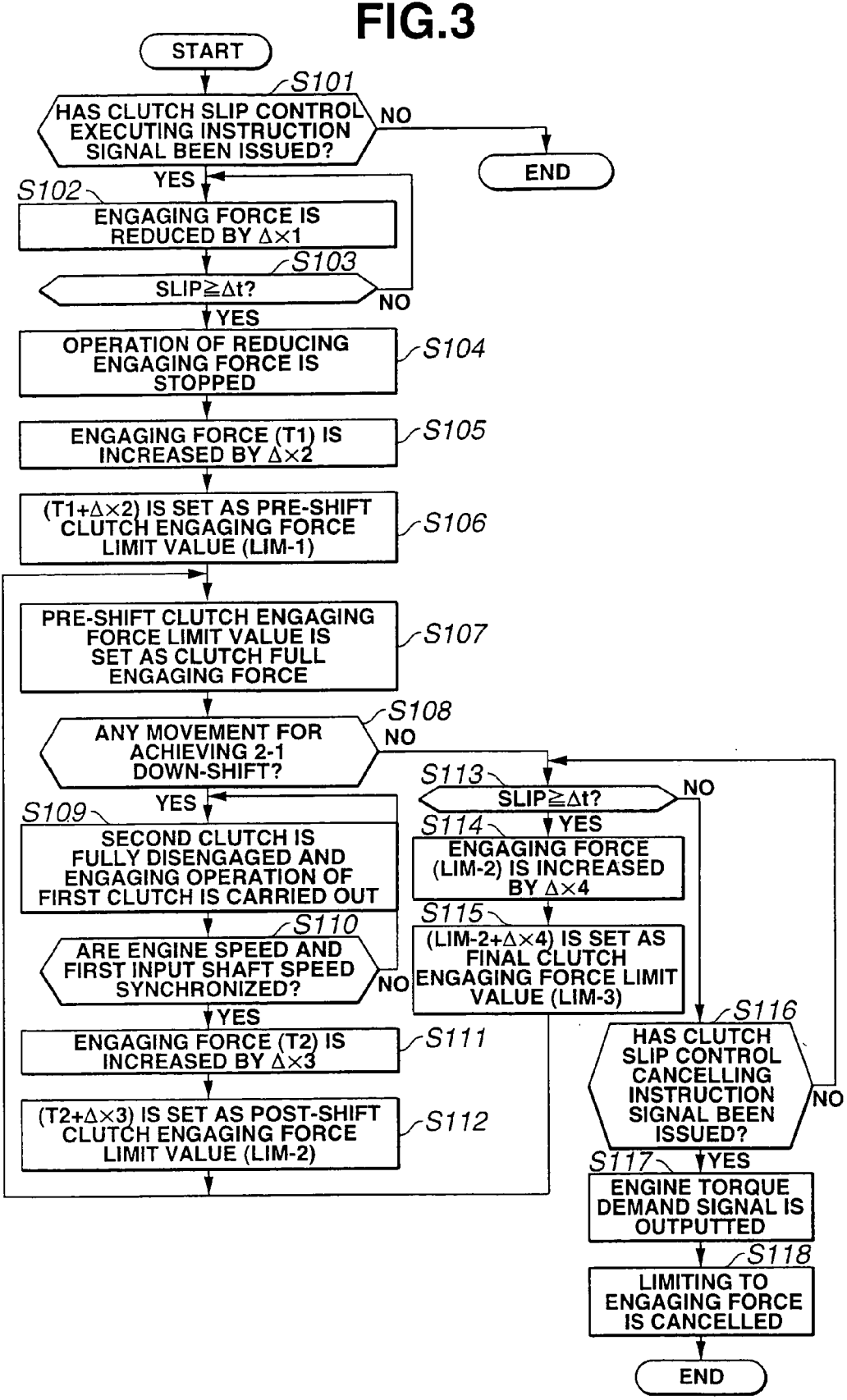
FIG. 3 is a flowchart showing programmed operation steps executed by the speed change control system when carrying out a clutch-slip control.

Referring to FIG. 3, there is shown a flowchart showing programmed operation steps that are executed by transmission control unit (ATCU) 80 in cooperation with engine control unit 70 for carrying out a so-called clutch-slip control in the 2–1 down-shift.

It is to be noted that the clutch-slip control is the control applied to a clutch which is in a slip state wherein the clutch partially connects drive and driven members while allowing relative rotation therebetween to a certain extent.

As is described hereinabove, under second speed, second clutch 40b is engaged, and by the work of 2–4 shift clutch 220, second speed driven gear 42 is united with countershaft 23. In this second speed, also first clutch 40a assumes its engaged condition. Other shift clutches 210, 230 and 240 assume their neutral conditions.

At step S101, judgment is carried out as to whether a clutch-slip control executing instruction signal has been issued or not. If NO, that, when such instruction signal has not been issued, the operation flow goes to END. While, if YES, that is, when such instruction signal has been issued, the operation flow goes to step S102. The system may be so made that the clutch-slip control executing instruction signal is produced when the accelerator depression degree is smaller than a predetermined degree, that is, for example, when a throttle open degree is smaller than ⅛ of full throttle producing a smaller engine torque after completion of a speed change.

At step S102, the engaging force of second clutch 40b is reduced by "Δ×1". Then, the operation goes to step S103.

At step S103, judgment is carried out as to whether a slip degree "SLIP" of second clutch 40b is higher than a predetermined degree "Δt" or not. If YES, that is, when the slip degree "SLIP" is higher than the predetermined degree "Δt", the operation flow goes to step S104. While, If NO, that is, when the slip degree is lower than the predetermined degree, the operation step goes back to step S102. With repeating of this back flow, the engaging force of second clutch 40b is gradually reduced.

At step S104, the operation for reducing the engaging force of second clutch 40b is stopped.

Then, at step S105, an engaging force "T1" of second clutch 40b produced at the time when the clutch 40b shows the slip degree "SLIP" higher than the predetermined degree "Δt" is increased by "Δ×2".

At step S106, the value (viz., T1+Δ×2) determined at step S105 is set as a pre-shift clutch engaging force limit value "LIM-1".

At step S107, the pre-shift clutch engaging force limit valve "Lim-1" is set as a full engaging force for second clutch 40b.

At step S108, judgment is carried out as to whether any movement for achieving the 2–1 down-shift has taken place or not. The movement may include a shift action by a driver and/or a state wherein due to the speed change action, the vehicle speed is reduced to a threshold for such 2–1 down-shift. If YES, that is, when there is any movement for achieving such 2–1 down-shift, the operation flow goes to step 109. While, if NO, that is, when there is no such movement, the operation flow goes to step S113.

At step S109, second clutch 40b is fully disengaged and engaging operation of first clutch 40a is started.

At step S110, judgment is carried out as to whether the engine speed and the rotation speed of first input shaft 21 are synchronized or not. If YES, that is, when the engine speed and the rotation speed of first input shaft 21 become synchronized, the operation flow goes to step S111. While, If NO, that is, when the synchronization is not achieved, the operation flow goes back to S109.

At step S111, an engaging force "T2" of first clutch 40a produced at the time when the synchronization is achieved is increased by "Δ×3".

At step S112, the value (viz., T2+Δ×3) determined at step S111 is set as a post-shift clutch engaging force limit value "LIM-2". Then, the operation flow goes back to step S107.

At step S113, judgment is carried out as to whether with the post-shift clutch engaging force limit value being "LIM-2", a slip degree "SLIP" of first clutch 40a is higher than a predetermined degree "Δt" or not. If YES, that is, when the slip degree "SLIP" is higher than the predetermined degree "Δt", the operation flow goes to step S114. While, if NO, that is, when the slip degree is lower than the predetermined degree, the operation flow goes to step S116.

At step S114, engaging force (LIM-2) of first clutch 40a is increased by "Δ×4".

At step S115, the value (viz., LIM-2+Δ×4) determined at step S114 is set as a final clutch engaging force limit value "LIM-3".

At step S116, judgment is carried out as to whether a clutch-slip control canceling instruction signal has been issued or not. If YES, that is, when such instruction signal has been issued, the operation flow goes to step S117. While, if NO, that is, when such instruction signal has not bee issued, the operation flow goes back to step S113. The system may be so made that the clutch-slip control canceling instruction signal is produced when the accelerator depression degree becomes larger than a predetermined degree.

At step S117, an engine torque demand signal is outputted to engine control unit (ECU) 70 for suppressing rapid increase of the engine torque.

At step S118, the limiting to the engaging force of first clutch 40a is cancelled.

Figure 4:
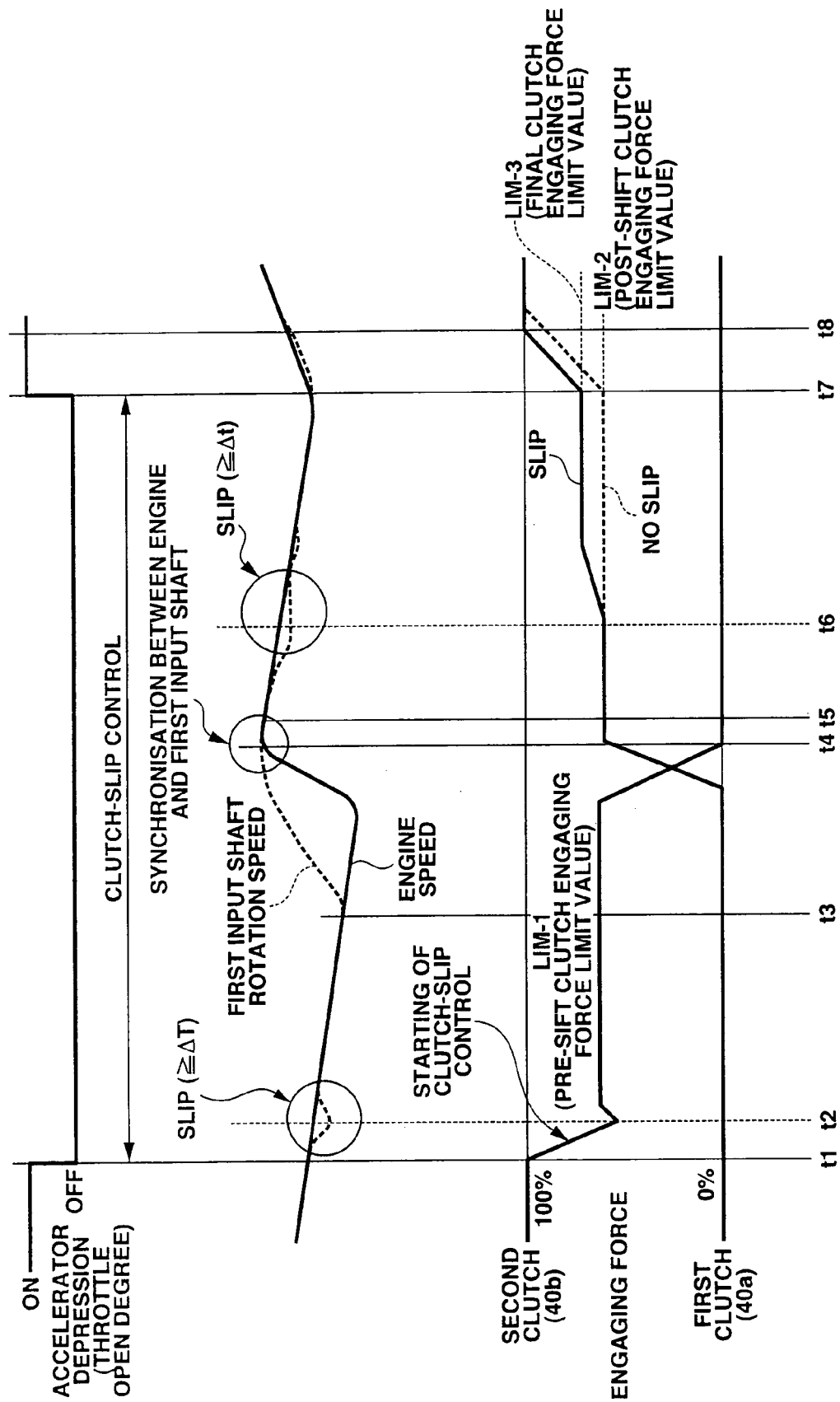
FIG. 4 is a time chart pictorially describing the slip state of two clutches under the clutch-slip control.

Referring to FIG. 4, there is shown a flowchart that pictorially shows the clutch-slip control that is carried out in the 2–1 down-shift.

At time "t1" when the accelerator becomes OFF, that is, when the accelerator depression degree becomes smaller than the predetermined degree, the clutch-slip control is started. From this time, the engaging force of second clutch 40b is gradually reduced one (Δ×1) by one (Δ×1). At time "t2", due to reduction of the engaging force of second clutch 40b, the slip degree "SLIP" of second clutch 40b becomes higher than the predetermined degree "Δt". At this time "t2", the pre-shift clutch engaging force limit value "LIM-1" that is equal to (T1+Δ×2) is provided for second clutch 40b. With this engaging force limitation, second clutch 40b is controlled to produce an appropriate engaging force and thus energy loss caused by excessive slip of mutually engaging elements of the clutch 40b and heat generation and wearing of such mutually engaging elements can be minimized.

At time "t3", due to reduction in speed of the vehicle, the down-shift is started actually. After this, the engaging force of second clutch 40b is sharply reduced toward 0 (zero), and first clutch 40a starts to produce the engaging force.

At time "t4", the engine speed and the rotation speed of first input shaft 21 become synchronized.

At time "t5", the post-shift clutch engaging force limit value "LIM-2" that is equal to (T2+Δ×3), is provided for first clutch 40a.

At step "t6", there is produced a slip of first clutch 40a that is higher than the predetermined degree "Δt". Upon this, the final clutch engaging force limit value "LIM-3" that is equal to (LIM-2+Δ×4), is provided for first clutch 40a. As shown, if such slip is not produced, the post-shift value "LIM-2" is kept for first clutch 40a.

At time "t7", the clutch-slip control canceling instruction signal is issued due to a certain depression of the accelerator pedal by the driver. Upon this, the engaging force produced by first clutch 40a is increased to 100% (at time "t8") to effectively and smoothly receive the engine torque. Thus, excessive slip of first clutch 40a and undesired engine roaring are suppressed or at least minimized during the speed change of the transmission 20.

As is described hereinabove, in the present invention, upon sensing the throttle open degree being smaller than a predetermined degree, the clutch-slip control for applying a limitation to the engaging force of the first or second clutch 40a or 40b is carried out. With this, the engaging force of the clutch 40a or 40b can be controlled to a degree appropriate for the torque applied to the transmission from the engine. This reduces the undesired shift shock.

As is understood from the time-chart of FIG. 4, in the above-mentioned 2–1 down-shift, the engaging force of second clutch 40b is kept lowered (viz., LIM-1) before effecting the clutch change (viz., just before time "t4"). Thus, the full disengagement of this clutch 40b is achieved with a shorter time. Furthermore, the engaging force of first clutch 40a is set to show a lower level (viz., LIM-2) upon having the clutch change. Thus, first clutch 40 needs only shorter time for reaching such engaging force from zero level. These induce a reduction in time needed for the speed change by transmission 20. In other words, higher responsiveness is obtained in the speed change.

The entire contents of Japanese Patent Application 2003-105400 (filed Apr. 9, 2003) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A multistage automatic transmission for use with an engine of a motor vehicle, comprising:
    a first clutch that is able to establish an odd speed of the transmission when engaged,
    a second clutch that is able to establish an even speed of the transmission when engaged;
    a first clutch actuator that adjusts an engaging force produced by the first clutch;
    a second clutch actuator that adjusts an engaging force produced by the second clutch;
    a throttle open degree sensor that detects an open degree of a throttle valve of the engine; and
    a control unit that issues instruction signals to the first and second clutch actuators upon processing information signals applied thereto,
    the control unit being configured to carry out:
    determining a desired speed of the transmission upon receiving the information signals;
    issuing an instruction signal to at least one of the first and second clutch actuators to engage the corresponding one of the first and second clutches for establishing the desired speed; and
    issuing an instruction signal to at least one of the first and second clutch actuators for applying a limitation to an engaging force produced by the corresponding one of the first and second clutches when the open degree of the throttle valve becomes smaller than a predetermined degree.

2. A multistage automatic transmission as claimed in claim 1, in which the control unit is further configured to carry out:
    when, with one of the first and second clutches being subjected to the limitation of the engine force, an instruction signal for achieving a speed change is applied thereto, issuing an instruction signal to the clutch actuator of the other one of the first and second clutches for applying a limitation of the engaging force of the other one of the clutches; and
    carrying out the speed change while keeping the limitation of the engaging force to the first and second clutches.

3. A multistage automatic transmission as claimed in claim 2, in which the control unit is further configured to carry out:
    when, under the speed change operation keeping the limitation of the engaging force to the first and second clutches, a certain slip takes place by the other one of the clutches, issuing an instruction signal to the other one of the clutch actuators to increase the engaging force produced by the other one of the clutches.

4. A multistage automatic transmission as claimed in claim 1, in which the limitation of the engaging force of the corresponding clutch is provided in such a manner as to suppress or at least minimize a slip of the corresponding clutch that would occur when the open degree of the throttle valve is smaller than the predetermined degree.

5. A multistage automatic transmission as claimed in claim 4, in which the predetermined degree is about $1/8$ of full throttle opening of the throttle valve.

6. A multistage automatic transmission as claimed in claim 1, further comprising:
    a first input shaft connectable with the first clutch;
    a first speed drive gear tightly mounted on the first input shaft;
    a second input shaft connectable with the second clutch;
    a second speed drive gear tightly mounted on the second input shaft;
    a countershaft extending in parallel with the first and second input shafts;
    a first speed driven gear rotatably disposed about the countershaft and constantly meshed with the first speed drive gear;
    a second speed driven gear rotatably disposed about the countershaft and constantly meshed with the second speed drive gear;
    a first speed shift clutch disposed about the countershaft to selectively connect the first speed driven gear to the countershaft; and
    a second speed shift clutch disposed about the countershaft to selectively connect the second speed driven gear to the countershaft.

7. A multistage automatic transmission as claimed in claim 6, in which the second input shaft is of a tube type that coaxially receives therein a part of the first input shaft.

8. A multistage automatic transmission for use with an engine of a motor vehicle, comprising:
    a first clutch that is able to establish an odd speed of the transmission when engaged,
    a second clutch that is able to establish an even speed of the transmission when engaged;
    a first clutch actuator that adjusts an engaging force produced by the first clutch;
    a second clutch actuator that adjusts an engaging force produced by the second clutch;
    a throttle open degree sensor that detects an open degree of a throttle valve of the engine; and
    a control unit that issues instruction signals to the first and second clutch actuators upon processing information signals applied thereto,
    the control unit comprising:
    a first section that determines a desired speed of the transmission upon receiving the information signals;
    a second section that issues an instruction signal to at least one of the first and second clutch actuators to engage the corresponding one of the first and second clutches for establishing the desired speed; and a third section that issues an instruction signal to at least one of the first and second clutch actuators for applying a limitation to an engaging force produced by the corresponding one of the first and second clutches when the open degree of the throttle valve is smaller than a predetermined degree.

9. In a multistage automatic transmission for use with an engine of a motor vehicle, which comprises a first clutch that is able to establish an odd speed of the transmission when engaged, a second clutch that is able to establish an even speed of the transmission when engaged; a first clutch actuator that adjusts an engaging force produced by the first clutch; a second clutch actuator that adjusts an engaging force produced by the second clutch; and a throttle open degree sensor that detects an open degree of a throttle valve of the engine, a method for controlling the transmission comprising:

determining a desired speed of the transmission upon receiving information signals;

issuing an instruction signal to at least one of the first and second clutch actuators to engage the corresponding one of the first and second clutches for establishing the desired speed; and issuing an instruction signal to at least one of the first and second clutch actuators for applying a limitation to an engaging force produced by the corresponding one of the first and second clutches when the open degree of the throttle valve is smaller than a predetermined degree.

* * * * *